United States Patent

Flory et al.

[11] 3,714,869
[45] Feb. 6, 1973

[54] HYDRAULIC POWER BRAKE UNIT

[75] Inventors: Donald M. Flory, Arcanum; Elton S. Moyer, Centerville; Thomas D. Naismith, Dayton, all of Ohio 45459

[73] Assignee: General Motors Corporation, Detroit, Mich.

[22] Filed: March 26, 1971

[21] Appl. No.: 128,357

[52] U.S. Cl. .......................91/434, 91/391, 91/469
[51] Int. Cl. ..........................F15b 13/14, F15b 13/10
[58] Field of Search....91/434, 391 R, 469, 372, 370, 91/371, 373

[56] References Cited

UNITED STATES PATENTS

| 3,173,339 | 3/1965 | Larsen | 91/434 |
| 3,532,027 | 10/1970 | MacDuff | 91/372 |

*Primary Examiner*—Paul E. Maslousky
*Attorney*—W. E. Finken and D. D. McGraw

[57] ABSTRACT

A hydraulic power brake unit including a power piston operatively engaging a conventional master cylinder and an annular valve spool having differential end areas communicating with the power chamber formed by the power piston and being normally positioned in the housing to communicate hydraulic fluid from a pressure source to the power steering unit and communicate the power chamber to the power source reservoir. When the brake pedal is actuated, an actuating spring acting between the valve spool and a reaction piston attached to the pedal pushrod is compressed and the valve spool is moved to restrict fluid communication from the pressure source to the power steering unit and divert the flow to the power chamber while simultaneously blocking communication of the power chamber to the reservoir so that the power chamber is pressurized and the power piston fluidly displaced to actuate the master cylinder. The power chamber pressure acts on the differential area of the valve spool to resist its movement by the actuating spring and causes it to function as a regulating valve which continuously provides a power chamber pressure proportional to the force of the actuating spring. Upon a malfunction caused loss of hydraulic pressure the reaction piston moves into abutting engagement with the power piston to provide a rigid force transmitting link between the pushrod and the master cylinder whereby the brakes are actuated independently of the hydraulic boost.

3 Claims, 3 Drawing Figures

INVENTORS
Donald M. Flory,
Elton S. Moyer &
Thomas D. Naismith

BY D. D. McGraw
ATTORNEY

HYDRAULIC POWER BRAKE UNIT

The invention relates to a hydraulic power brake booster having valve means utilizing a single pressure source to operate the brake booster and supply a power steering unit.

It is desirable in a motor vehicle braking system to provide power assisted brake actuation. It is also desirable to utilize a single hydraulic pressure source to provide power assist for both vehicle braking and vehicle steering. Furthermore, it is desirable to provide a brake booster in which the piston travel during power assisted brake actuation is greater than the input pushrod travel so that a relatively high mechanical advantage pedal lever may be used, thus providing the capability for generating an adequate brake pressure upon manual brake actuation subsequent to a loss of booster operating pressure.

The present invention provides a hydraulic power brake unit wherein a hydraulic power chamber is defined by a power piston which is slidable in a housing bore and which operatively engages a conventional master cylinder. An annular valve spool in the housing normally communicates hydraulic fluid from a pressure source to the power steering unit and communicates the power chamber to the pressure source reservoir. A valve actuating mechanism includes a pushrod attached to the brake pedal, a reaction piston slidable in the housing bore and attached to the pushrod, and a spring acting between the reaction piston and the valve spool to transmit force therebetween. When the brake pedal is actuated, the valve spool is moved in the housing to restrict fluid communication from the pressure source to the power steering unit and divert the flow to the power chamber while simultaneously blocking communication of the power chamber to the reservoir so that the power chamber is pressurized and the power piston fluidly displaced in the housing to actuate the master cylinder. The power chamber pressure acts on the reaction piston to resist its movement into the housing.

The housing bore and the annular valve spool are respectively stepped to provide a differential end area on the valve spool. The force of a fixed capacity spring and the power chamber pressure force acting on the differential area resist movement of the valve spool by the actuating spring. The valve spool travels within a relatively small range of displacement when unbalanced by the opposing forces and functions as a regulating valve to continuously provide a power chamber pressure which is proportional to the force of the actuating spring. The amount of pushrod and reaction piston travel necessary to build a valve actuating force in the spring is less than the resulting travel of the power piston, thereby minimizing the amount of brake pedal travel necessary to actuate the brakes.

A rod portion of the reaction piston extends through the annular valve spool and is piloted in a recess in the power piston. Upon a loss of hydraulic pressure from the pressure source and consequently an absence of power chamber pressure to resist movement of the reaction piston in the housing, the rod portion of the reaction piston abuttingly engages the power piston and the brakes are actuated by the resulting rigid force transmitting link between the pushrod and the master cylinder independently of the hydraulic boost.

Figure 1:
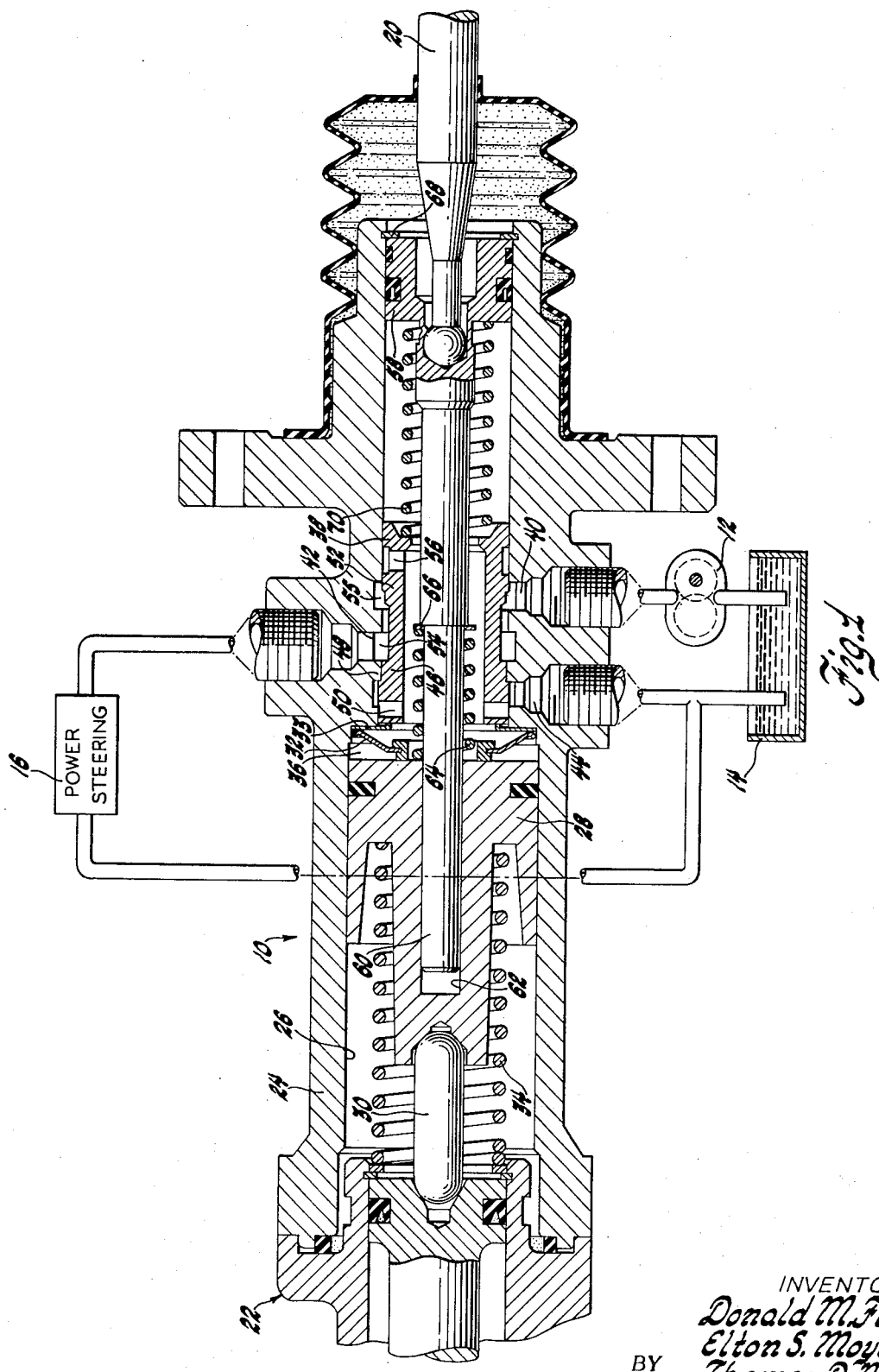
FIG. 1 is a schematic view of a vehicle hydraulic power brake and power steering system including a sectional view of the hydraulic power brake unit.

Referring to FIG. 1, the hydraulic power brake unit, indicated generally at 10, is a component of a vehicle hydraulic system including a pump 12, a reservoir 14, and a power steering unit 16. The hydraulic power brake unit 10 is actuated by a pedal operated pushrod 20 and functions to provide a power assist for actuation of a conventional master cylinder indicated generally at 22.

The hydraulic power brake unit 10 includes a housing 24 having a stepped bore 26 extending axially therethrough. A power piston 28 is sealingly slidable in the stepped bore 26 and a pushrod 30 extends between the power piston and the master cylinder assembly 22. An annular grommet 32 is seated at a shoulder formed by the stepped bore 26 and serves as a stop to limit rightward travel of power piston 28. A spring 34 seated at the master cylinder assembly 22 urges power piston 28 into engagement with grommet 32. The piston 28 and housing 24 cooperate to form a power chamber 36. Introduction of pressurized hydraulic fluid into the power chamber 36 displaces piston 28 leftwardly to actuate the master cylinder assembly 22 and thus the vehicle wheel brakes fluidly connected thereto.

A valve assembly is provided which introduces pressurized hydraulic fluid into power chamber 36 in proportion to the force applied to pedal pushrod 20 by the vehicle operator. The housing 24 includes a pressure inlet port 40 connected to the pump 12, a power steering port 42 connected to the power steering unit 16, and a reservoir port 44 connected to the reservoir 14. The valve assembly includes an annular valve spool 38 which is slidable in the stepped bore 26 of housing 24. The annular valve spool 38 includes a stepped land 46 located between power steering port 42 and reservoir port 44. The stepped land 46 is engageable with a shoulder 48 formed by the stepped bore 26 so as to limit the rightward movement of valve spool 38. It will be seen that the stepped land 46 causes the left end area of valve spool 38 to be larger than the right end area of the valve spool and thereby provides a differential end area. Spring 33 is seated at housing 24 by the annular grommet 32 and engages the valve spool 38 urging it to its fully rightward position as limited by the engagement of stepped land 46 with shoulder 48. The radial passage 50 drilled in the valve spool 38 connects the reservoir port 44 with the power chamber 36 when the valve spool 38 is in its fully rightward or rest position as shown in FIG. 1. Consequently, the power chamber 36 is at zero pressure and the brakes are not actuated. The valve spool 38 also includes a land 52 which sealingly engages the stepped bore 26 and is axially spaced from the land 46 so as to define an annular chamber 54 between the valve spool 38 and the housing 24. The annular chamber 54 connects the pressure inlet port 40 and the power steering port 42. A radial passage 56 is drilled in valve spool 38 adjacent the land 52 and connects the pressure inlet port 40 with the power chamber 36 when the valve spool 38 is moved leftwardly from its rest position of FIG. 1. The land 52 is undercut or stepped to form an annular chamber 55 between valve spool 38 and stepped bore 26 of housing 24 which communicates with annular chamber 54 so that as the valve spool 38 is progressively moved leftward from the rest position the land 52 restricts the communication of hydraulic fluid from the pressure inlet port 40 to the power steering port 42. Thus, as the spool 38 is moved leftwardly from its rest position of FIG. 1, flow is progressively restricted but never completely blocked from the pressure inlet port 40 to the power steering port 42 and a pressure increase results at pressure inlet port 40. Simultaneously, the hydraulic flow is opened from the pressure inlet port 40 to the radial passage 56 and thence to the power chamber 36 and the power chamber 36 is progressively blocked from communicating with the reservoir port 44. The resulting pressurization of power chamber 36 forces power piston 28 leftwardly actuating the master cylinder 22.

A valve actuating linkage is provided between the pedal pushrod 20 and the valve spool 38. Reaction piston 58 is sealingly slidable in the stepped bore 26, is attached to the pedal pushrod 20, and forms a wall of the power chamber 36. An axially extending rod 60 is formed integrally with the reaction piston 58 and extends through the annular valve spool 38. The end of rod 60 is piloted in an axially extending bore 62 formed in the power piston 28. A spring 64 actuating between the power piston and a washer 66 seated at a shoulder on rod 60 urges the reaction piston 58 into engagement of a snap ring 68 seated in stepped bore 26. A spring 70 is seated at reaction piston 58 and at annular valve spool 38 and provides the sole force transmitting link therebetween. The preload force of spring 70 is less than that of spring 33 and consequently the valve spool 38 is held in its rest position of FIG. 1 by spring 34.

In operation, when the components of the hydraulic power brake unit 10 are in their rest positions as shown in FIG. 1, fluid pressure from pump 12 is communicated from the pressure inlet port 40 through the annular chamber 54 to the power steering port 42 and thence to the power steering unit 16. Land 52 blocks fluid communication through the radial passage 56 to power chamber 36. Radial passage 50 connects the power chamber 36 with the reservoir port 44 and consequently the brakes are not applied. The pressure relief valve 18 shunts excessive hydraulic pressure around the power steering unit 16.

Figure 2:
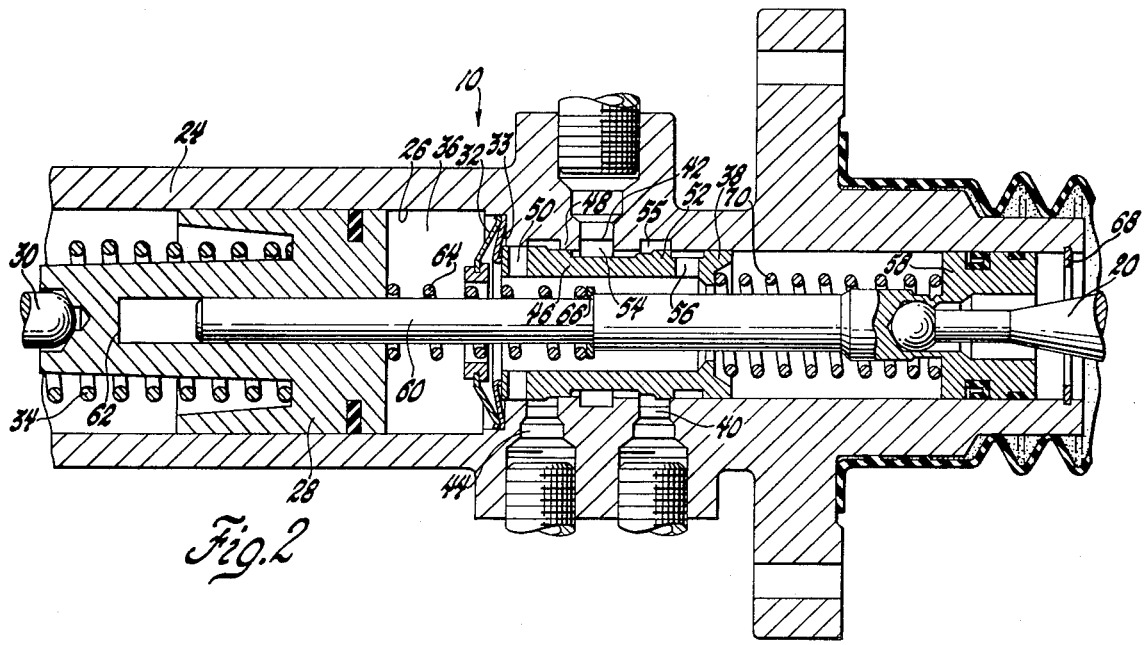
FIG. 2 is a sectional view of the hydraulic power brake unit shown in the brake apply position with the valve spool shown in its poised position.

Operator actuation of the pedal mechanism moves the pedal pushrod 20 and the reaction piston 58 leftwardly and when the load on spring 70 increases sufficiently to exceed the force of spring 33, valve spool 38 is moved leftwardly. Leftward movement of valve spool 38 simultaneously restricts flow to power steering port 42, closes reservoir port 44 and opens pressure inlet port 40 to the power chamber 36. The resulting pressure increase in power chamber 36 displaces power piston 28 leftwardly to actuate the master cylinder 22 and the wheel brakes. The power chamber pressure also acts on the reaction piston 58 to provide a pedal reaction force which is proportional to the degree of brake actuation. The power chamber pressure also acts on both ends of the valve spool 38 and urges the valve spool 38 rightwardly by virtue of the differential in valve spool end area between the larger left end and smaller right end as provided by stepped land 46. Leftward movement of the valve spool 38 is resisted by the spring force of spring 33 and by the pressure force of the pressure in power chamber 36 acting on the differential area of valve spool 38 resulting from the stepped land 46 thereof. The power chamber pressure acting on the differential area induces a proportioned return effort which causes the valve spool 38 to act as a pressure regulating valve. For example, if an abrupt brake actuation causes the valve spool 38 to overtravel in the leftward direction and results in a brake pressure in power chamber 36 which is disproportionate to the pedal effort, the power chamber pressure acts on both ends of the valve spool and the pressure force acting on the differential area of valve spool 38 provided by stepped land 46 causes it to return rightwardly to restore the normal proportionality between the power chamber pressure and the load on spring 70. Such leftward travel of valve spool 38 is limited by engagement with annular grommet 32 to the range within which it can control the power chamber pressure. When the vehicle operator reduces the force being applied to the pedal mechanism, the spring 70 is unloaded allowing the power chamber pressure and the force of spring 33 to move annular spool 38 and reduce the power chamber pressure 36 to a level which is proportional to the reduced load on spring 70. Thus, during brake actuation the spool 38 is constantly seeking a poised or balanced position as shown in FIG. 2. For any given level of brake actuation the amount of pushrod 20 travel resulting from compression of spring 70 is less than the corresponding travel of power piston 28. The length of rod 60 which is piloted in bore 62 of power piston 28 is sufficient to prevent disengagement at maximum separation, of the power piston 28 and the rod 60.

Figure 3:
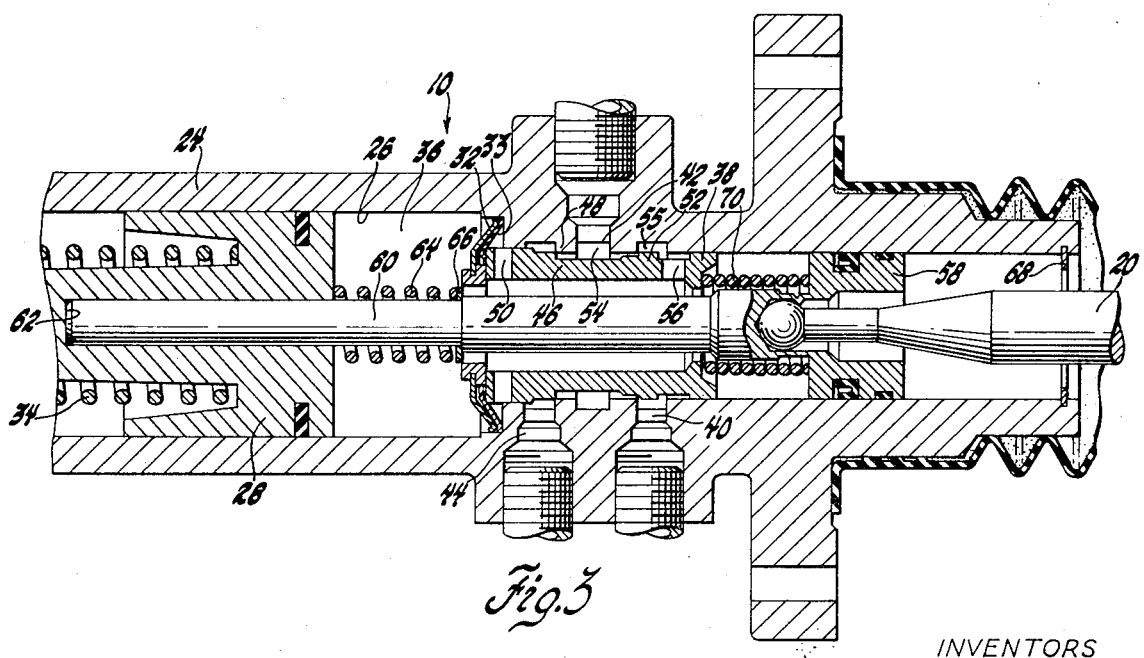
FIG. 3 is a sectional view of the power brake unit shown during mechanical brake actuation upon loss of hydraulic pressure.

Referring to FIG. 3, the hydraulic power brake unit 10 is shown in operation upon a failure of the hydraulic pressure source or a similar malfunction resulting in a pressure loss. When the hydraulic pump 12 fails, there is, upon brake actuation, no hydraulic pressure in the power chamber 36, and thus there is no reaction force on the reaction piston 58. Consequently, the reaction piston 58 moves axially into the housing 24 until the end of its rod 60 engages the bottom of bore 62. The resulting abutting engagement of rod 60 of reaction piston 58 with the power piston 28 provides a direct force transmitting link between the pedal pushrod 20 and the master cylinder 22 whereby the brakes are actuated independently of the hydraulic booster pressure. Inasmuch as there is no pressure acting on the differential area of valve spool 38, valve spool 38 is moved leftwardly by the load on spring 70 until it engages and is stopped by annular grommet 32. When the vehicle operator relieves the pedal force, the springs 34, 64 and 70 cooperate to return the components of the hydraulic power brake unit 10 to their rest positions as shown in FIG. 1.

What is claimed is:
1. A hydraulic brake booster comprising:
   a housing having a longitudinally extending stepped bore therein, a pressure inlet port, a reservoir port, and a power steering port;

a power piston sealingly slidable in the stepped bore to define a power chamber;

a valve spool slidable in the stepped bore and having at least first and second axially spaced lands forming a first annular chamber therebetween and with the stepped bore, said first land having an undercut portion forming a second annular chamber with the stepped bore and communicating with the first annular chamber, and fluid passage means in the spool communicating with the power chamber, said lands being located in relation to the aforementioned ports and fluid passage means whereby the first and second annular chambers communicate fluid from the pressure inlet port to the power steering port and the power chamber communicates with the reservoir port;

operator actuatable means including spring means engaging the valve spool and urging it to move relative to the housing to an operating position wherein the first and second annular chambers restrictively communicate the pressure inlet port to the power steering port and the resulting increased inlet port pressure is communicated to the power chamber through the passage means to actuate the power piston;

and the valve spool having a stepped outer diameter cooperable with the stepped housing bore to provide a differential end area acted upon by the power chamber pressure in a direction opposing the operator actuatable means whereby the spool is balanced by the opposing forces in a poised position wherein the first and second lands respectively block communication between the power chamber and both the pressure inlet and reservoir ports.

2. A hydraulic brake booster comprising:

a housing having a longitudinally extending stepped bore therethrough, a pressure inlet port, a reservoir port, and a power steering port;

a power piston sealingly slidable in the stepped bore to define a power chamber;

a valve spool slidable in the stepped bore and having a stepped outer diameter forming a shoulder cooperable with the stepped housing bore to limit movement of the valve spool in one direction and to provide a differential end area on the spool, at least first and second axially spaced lands forming a first annular chamber therebetween, said first land having an undercut portion forming with the stepped bore a second annular chamber communicating with the first annular chamber, and fluid passage means in the spool communicating the axially outer ends of the first and second lands to the power chamber;

first spring means urging the valve spool to a position relative to the housing wherein the shoulder engages the stepped bore and wherein the power chamber is communicated to the reservoir port and the first and second annular chambers unrestrictingly communicate fluid from the pressure inlet port to the power steering port;

operator actuatable means including a reaction piston sealingly slidable in the stepped bore and forming a wall of the power chamber to provide a reaction force on the operator actuatable means proportional to the power chamber pressure;

second spring means acting between the reaction piston and the valve spool and upon operator actuation urging the valve spool to an operating position relative the housing wherein the first and second annular chambers restrictively communicate the fluid inlet port to the power steering port and the resulting inlet port pressure increase is communicated to the power chamber through the fluid passage means to actuate the power piston and the master cylinder;

and the power chamber pressure acting on the differential end area of the valve spool causes the spool to continuously seek a balanced position wherein the first and second lands block communication between the power chamber and both the pressure inlet and reservoir ports so that the power chamber pressure is regulated proportionally to the second spring force.

3. A hydraulic brake booster comprising:

a housing having a longitudinally extending stepped bore therein, a pressure inlet port, a reservoir port, and a power steering port;

a power piston sealingly slidable in the stepped bore to define a power chamber;

a valve spool slidable in the stepped bore and having at least first and second axially spaced lands forming a first annular chamber therebetween, said first land having an undercut portion forming with the stepped bore a second annular chamber communicating with the first annular chamber, and fluid passage means in the spool communicating with the power chamber, said lands being normally located in relation to the aforementioned ports and fluid passage means whereby the first and second annular chambers communicate fluid from the pressure inlet port to the power steering port and the power chamber communicates with the reservoir port;

operator actuatable means including a reaction piston sealingly slidable in the stepped bore and forming a wall of the power chamber to provide a reaction force on the operator actuatable means proportional to the power chamber pressure, an axially extending portion of the reaction piston extending through the annular valve spool and into close axial relationship with the power piston, the reaction piston being movable into abutting engagement with the power piston upon power chamber pressure loss whereby the power piston is actuated independently of the hydraulic boost;

spring means acting between the reaction piston and the valve spool and upon operator actuation urging the valve spool to move relative the housing to an operating position wherein the first and second annular chambers restrictively communicate the pressure inlet port to the power steering port and the resulting increased inlet port pressure is communicated to the power chamber through the passage means to actuate the power piston;

and the valve spool having a stepped outer diameter cooperable with the stepped housing bore to provide a differential area acted upon by the power chamber pressure in a direction opposing the operator actuatable means whereby the spool continuously seeks a balanced position wherein the first and second lands respectively block communication between the power chamber and both the pressure inlet and reservoir ports.

* * * * *